UNITED STATES PATENT OFFICE.

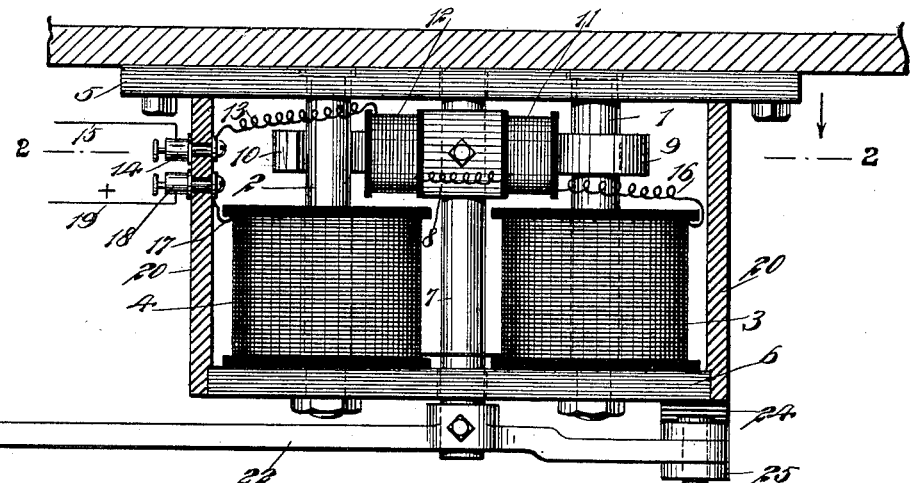

RICHARD ALFRED JOHN EVANS, OF CHICAGO, ILLINOIS.

ELECTRIC MOTOR FOR BRAKES.

SPECIFICATION forming part of Letters Patent No. 630,205, dated August 1, 1899.

Application filed February 8, 1899. Serial No. 704,908. (No model.)

*To all whom it may concern:*

Be it known that I, RICHARD ALFRED JOHN EVANS, of Chicago, (Pullman,) in the county of Cook and State of Illinois, have invented a new and Improved Electric Motor for Brakes, of which the following is a full, clear, and exact description.

This invention relates to motors for operating the brakes of cars—such, for instance, as electrically-operated cars, either surface or elevated; and the object is to provide a brake-operating motor of simple construction and by means of which a great pressure may be exerted upon the brake by a comparatively small amount of electric current passing through the motor.

I will describe an electric motor for brakes embodying my invention and then point out the novel features in the appended claims.

Reference is to be had to the accompanying drawings, forming a part of this specification, in which similar characters of reference indicate corresponding parts in all the views.

Figure 1 is an elevation of a brake embodying my invention and showing its casing in section. Fig. 2 is a section on the line 2 2 of Fig. 1, and Fig. 3 is an end view of the invention.

The motor comprises field-pieces 1 2, extended upward from field-magnets 3 4 and connected at their top with a brass yoke or plate 5, and the lower ends of these field-pieces are connected to an iron plate 6. Having a bearing in the yoke 5 and also having a bearing through the plate 6 is the armature-shaft 7, on which the armature 8 is mounted. This armature 8 has its ends 9 10 extended outward and made in hook form or curved to conform, substantially, to the circular construction of the field-pieces, and these hook portions, of course, will be at all times within the lines of force of the field-pieces 1 and 2. The armature-windings 11 and 12 are connected in series, and one end has a connection 13 with a binding-post 14, with which a conductor 15 connects. These windings also have a connection 16 with the field-magnet 3, which is connected in series with the magnet 4, and this magnet 4 has a connection 17 with a binding-post 18, with which a conductor 19 engages.

The whole device is to be connected to the under side of a car, and the current may be controlled by the motorman operating a device in the usual resistance-box. The sides and ends are suitably inclosed by end pieces 20 and side pieces 21, one of these side pieces 21 being hinged, so that it may be swung open to inspect or repair the motor when necessary.

To the lower end of the armature-shaft 7 is keyed a brake-operating lever 22, one end of which is to be connected to the brake mechanism in a suitable manner, which it is not deemed necessary to herein show. The other end of the lever 22 has pivotal connection with a rod 23, mounted to slide in an opening formed in the downwardly-extended portion of a bracket 24, attached to a portion of the motor-casing, and arranged between the said downwardly-extended portion of the bracket and the head portion 25 of the rod 23 is a coiled spring 26, designed to move the lever and the armature to a normal or open position when the electric circuit is opened.

In operation when it is desired to set the brakes the circuit is to be closed, causing the fields to attract or draw the armature, which, it will be seen, has a horizontal rocking motion. The hook extensions 9 and 10 of the armature will of course be drawn tightly against the field-pieces 1 and 2 at opposite sides, and therefore the field-pieces act as stops for the armature. This movement of the armature will rock the lever 22 to set the brake, and at the same time the spring 26 will be compressed, so that upon shutting off the current the said spring may move the parts to their normal position, as before mentioned.

Having thus described my invention, I claim as new and desire to secure by Letters Patent—

1. An electric motor for brakes, comprising two field-pieces, field-magnets thereon, an armature-shaft arranged between the field-magnets, an armature mounted on said shaft having projecting curved ends partly surrounding and mechanically engaging the field-pieces when a current is closed through the armature and field, the said armature having its windings connected in series and also connected in the field-magnets, and a brake-actuating lever attached to the armature-shaft, substantially as specified.

2. An electric motor for brakes, comprising upwardly-extended field-pieces connected with a yoke or plate, field-magnets on said field-pieces and supported on a plate, an armature-shaft having bearings in the yoke and through said plate, an armature secured to the shaft and having curved ends for partly surrounding and mechanically engaging with the field-pieces at opposite sides, windings on the armature connected in series with the field-magnets, a brake-actuating lever connected to the armature-shaft, and means for moving said lever when the current is closed from the motor, substantially as specified.

3. An electric motor for brakes, comprising field-pieces, field-magnets thereon, a yoke or plate to which the upper ends of the field-pieces are connected, an armature-shaft arranged between the field-pieces and mounted to rock, an armature secured to said shaft and having its projected ends concaved to conform substantially to the contour of the field-pieces, a lever having connection with the lower end of the armature-shaft, a rod having pivotal connection with one end of said lever, a bracket through which said rod is movable, and a spring arranged around said rod for moving the lever in one direction when the motor is deënergized, substantially as specified.

4. A motor, comprising field-magnets, field-pieces extended therefrom, an armature-shaft, and an armature on said shaft and having its windings connected to the field-magnets, the projected ends of said armature being curved to partially surround and mechanically engage the field-pieces, substantially as specified.

5. A brake-motor, comprising field-pieces, field-magnets on the field-pieces, and an armature having curved ends adapted to partially surround and to mechanically engage with the field-pieces, substantially as specified.

RICHARD ALFRED JOHN EVANS.

Witnesses:
GEO. STRAKEY,
ROBERT EVANS.